United States Patent
Kimura et al.

[11] Patent Number: 5,845,932
[45] Date of Patent: Dec. 8, 1998

[54] AIR BAG APPARATUS FOR VEHICLE

[75] Inventors: Masato Kimura, Kanagawa-ken; Yukisada Sunabashiri, Machida, both of Japan

[73] Assignee: Nissan Motor Co., Ltd., Kanagawa-ken, Japan

[21] Appl. No.: 866,387

[22] Filed: May 30, 1997

[30] Foreign Application Priority Data

May 31, 1996 [JP] Japan ................................. 8-139332

[51] Int. Cl.$^6$ ............................................ B60R 21/22
[52] U.S. Cl. ........................... 280/730.2; 280/730.1; 280/728.2
[58] Field of Search ................ 280/730.2, 730.1, 280/728.2, 732, 728.1

[56] References Cited

U.S. PATENT DOCUMENTS

| | | | |
|---|---|---|---|
| 5,639,111 | 6/1997 | Spencer et al. | 280/728.2 |
| 5,651,582 | 7/1997 | Nakano | 297/216.13 |
| 5,667,243 | 9/1997 | Fisher et al. | 280/730.2 |
| 5,676,394 | 10/1997 | Maly | 280/730.2 |
| 5,678,853 | 10/1997 | Maly | 280/730.2 |
| 5,690,354 | 11/1997 | Logan et al. | 280/728.2 |

FOREIGN PATENT DOCUMENTS

4-50052  2/1992  Japan.

*Primary Examiner*—Christopher P. Ellis
*Attorney, Agent, or Firm*—McDermott, Will & Emery

[57] ABSTRACT

An air bag apparatus for a vehicle according to the present invention includes a bracket secured to an arbitrary position of the vehicle and an air bag module attached to the bracket. The air bag module has a base attached to the bracket, an inflator for generating gas, an air bag body which is unfolded with gas generated by the inflator and a guide for restricting a direction in which the air bag body is unfolded. The base and the guide are individual elements arranged to be assembled to create a space. The base and the guide are arranged to be assembled so as to be disposed in the space created by the base and the guide. Therefore, the guide can be disposed in a limited space in the air bag module without obstructing the other units. Moreover, the guide is able to appropriately guide the direction in which the air bag body is unfolded.

20 Claims, 5 Drawing Sheets

AIR BAG APPARATUS FOR VEHICLE

BACKGROUND OF THE INVENTION

The present invention relates to an air bag apparatus for a vehicle structured to unfold an air bag when the vehicle encounters a collision to reduce the impact load so as to protect a passenger.

Hitherto, a variety of air bag apparatuses have been suggested as disclosed in, for example, Japanese Patent Laid-Open No. 4-50052 in order to prevent a direct shock which is generated between the side wall of a car body, for example, a door, which is deformed attributable to the impact load and a person who is sitting on a seat if a vehicle encounters a side collision.

In general, an air bag apparatus of the foregoing type has a panel-shape side bracket extending forwards and secured to a seat back frame disposed in an outer portion of a seat back in the widthwise direction of the vehicle. Moreover, an air bag module including an air bag body and an inflator is attached to the side bracket. If a collision of the vehicle takes place, gas generated by the inflator causes the air bag body to be unfolded forwards in front of the seat back so that the passenger is protected by the air bag body.

However, the above-mentioned conventional technology having the structure in which the air bag module is attached to the side bracket of the seat back involves the side portion of the seat back being projected sidewards. Thus, the gap between the seat back and the side of the car body is reduced unsatisfactorily. That is, the thickness of the air bag module including the metal inflator cannot easily be reduced. When the air bag module is attached to the side portion of the seat back, the side portion of the seat back projects toward the side wall of the car body. If the gap between the seat back and the side wall of the car body is reduced, the operation for mounting the seat on the car body cannot be performed in a large space and thus the operation cannot easily be performed.

It might therefore be feasible to employ a structure formed such that the inflator which causes the amount of the side projection to be enlarged is disposed in the rear of the seat back. Since the initial unfolding direction of the air bag body is made to be sideward in this case, a member for guiding the unfolding direction into the forward direction must be provided. Since the guide member is disposed in a limited space in the air bag module, the position of the guide member must be determined not to affect the other units, such as the inflator and the air bag body. That is, a satisfactory positional relationship with the other units must be established to enable the other units to easily be mounted and to obtain the required effect to prevent the side projection by disposing the inflator in the foregoing rear position.

SUMMARY OF THE INVENTION

In view of the foregoing, an object of the present invention is to provide an air bag apparatus for a vehicle capable of forwards guiding an air bag body in a limited space in an air bag module without obstructing other units.

In order to achieve the above-mentioned object, according to one aspect of the present invention, there is provided an air bag apparatus for a vehicle comprising: a bracket secured to an arbitrary position of the vehicle; and an air bag module attached to the bracket, wherein the air bag module is provided with a first member, a second member, an inflator for generating gas and an air bag body which is unfolded with the gas generated by the inflator, the second member restricts a direction in which the air bag body is unfolded, the first and second members are individual members arranged to be assembled to create a space, and the inflator and the air bag module are disposed in the space created by the first and second members.

The air bag module may be further provided with a resin cover which is split and opened when the air bag body is unfolded, the first member may be a base which is attached to the bracket, the second member may be a guide for restricting the direction in which the air bag body is unfolded, and the base of the guide may be attached to a projection of the base.

Since the above-mentioned structure is formed such that the base (the first member) and the guide (the second member) are individual elements, the inflator and the air bag body can easily be mounted on the space created by the base and the guide. That is, if the guide and the base are molded integrally, the inflator and the air bag body cannot easily be mounted on the space created by the guide and the base. Since the guide and the base are individual elements, a simple operation of placing and mounting the inflator and the air bag body on the space between the base and the guide enables the inflator and the air bag body to be mounted on the space between the guide and the base.

The inflator may be attached to the projection of the base, and the base of the guide may be held between the inflator and the base so as to be supported.

Since the above-mentioned structure is formed such that the base of the guide is held between the base and the inflator, the guide can strongly be attached to the base although the guide is the individual element.

Either the base of the guide or the projection of the base may have a projection portion formed vertically, and the other one of the base of the guide or the projection of the base may have a locating groove arranged to be engaged to the projection.

Since the above-mentioned structure is formed such that the engagement between the projection portion and the locating groove causes the guide to be located with respect to the projection of the base, the guide can easily be attached.

The guide may cover the outer region of the inflator, the leading end of the guide and the base may form an opening in a direction in which the air bag body is unfolded, and the cover may be disposed adjacent to the outer surface of the guide.

The above-mentioned structure is able to prevent dents of the cover toward the inflator.

The guide may have strength with which the guide can be deformed to the outside of the air bag module when unfolding force of the air bag body acts on the guide.

Since the above-mentioned structure is formed such that the guide has the strength with which the guide can be deformed to the outside when the unfolding force of the air bag body acts on the guide, the amount of projection of the air bag module can be prevented in a usual state. When the air bag module is operated, the guide is deformed outwards so that the space created by the guide is enlarged to form a space required for the air bag body to be unfolded.

The guide may have a thickness which is gradually reduced from the base thereof to the leading end thereof.

Since the above-mentioned structure is formed such that the thickness of the guide is gradually reduced from the base thereof to the leading end thereof, the base cannot easily be deformed and the leading end can easily be deformed. Thus, a significant effect to restrict (push) the direction in which the air bag body is unfolded can be obtained. Since the base of the guide has a large thickness, it can strongly be attached. Thus, separation of the guide from the base can be prevented.

DESCRIPTION OF THE PREFERRED EMBODIMENTS

A preferred embodiment of the present invention will now be described with reference to FIGS. 1 to 5. Note that symbols L shown in the drawings indicates the left-hand side (an outer portion in the widthwise direction of the vehicle) and R indicates the right-hand side (an inside portion in the widthwise direction of the vehicle).

Figure 1:
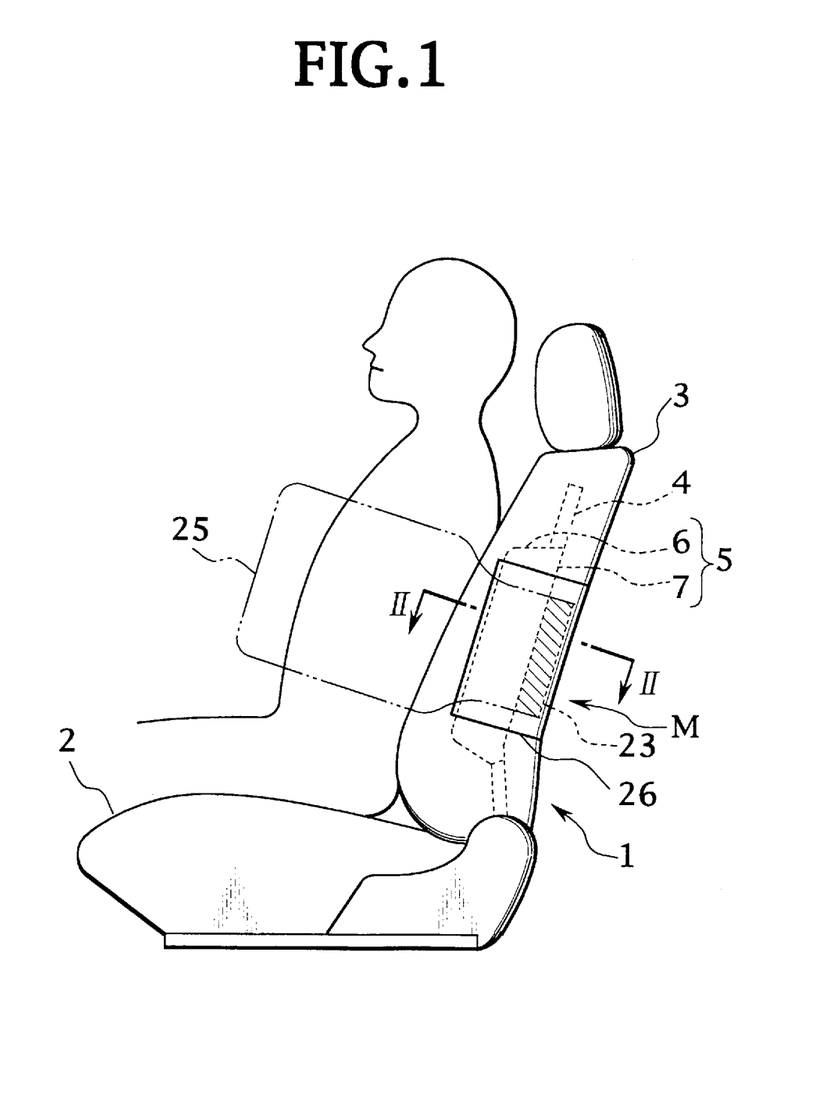
FIG. 1 is a side view of a seat for a vehicle showing an air bag apparatus according to an embodiment of the present invention.

FIG. 1 shows a left-hand front seat 1 of a vehicle consisting of a seat cushion 2 secured to a floor and a seat back 3 permitted to be inclined forwards. The seat back 3 is provided with a pipe-shape seat back frame 4. The overall shape of the seat back frame 4 is formed into a substantially U-shape facing downwards. A vertical portion of the seat back frame 4 is disposed in each of the right-hand portion and the left-hand portion of the seat back 3.

Figure 2:
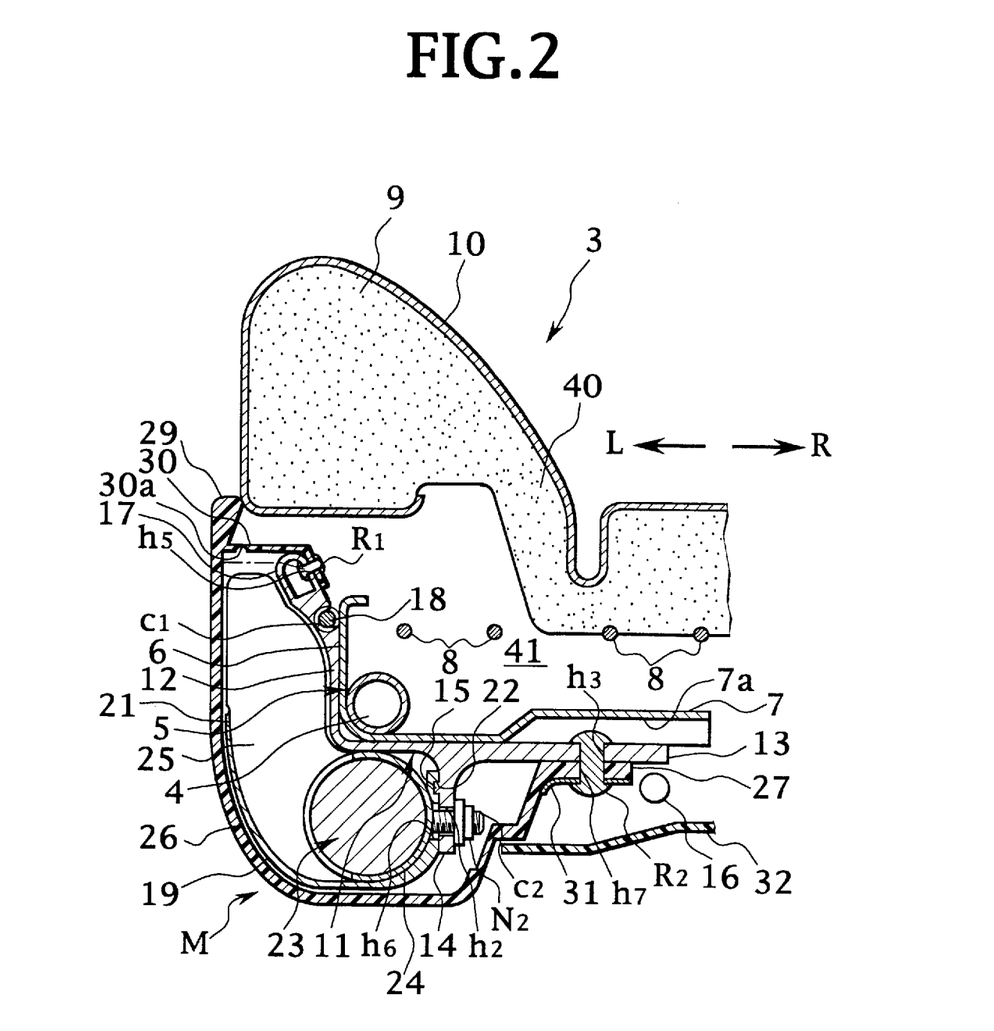
FIG. 2 is a cross sectional view taken along line II—II shown in FIG. 1.
Figure 4:
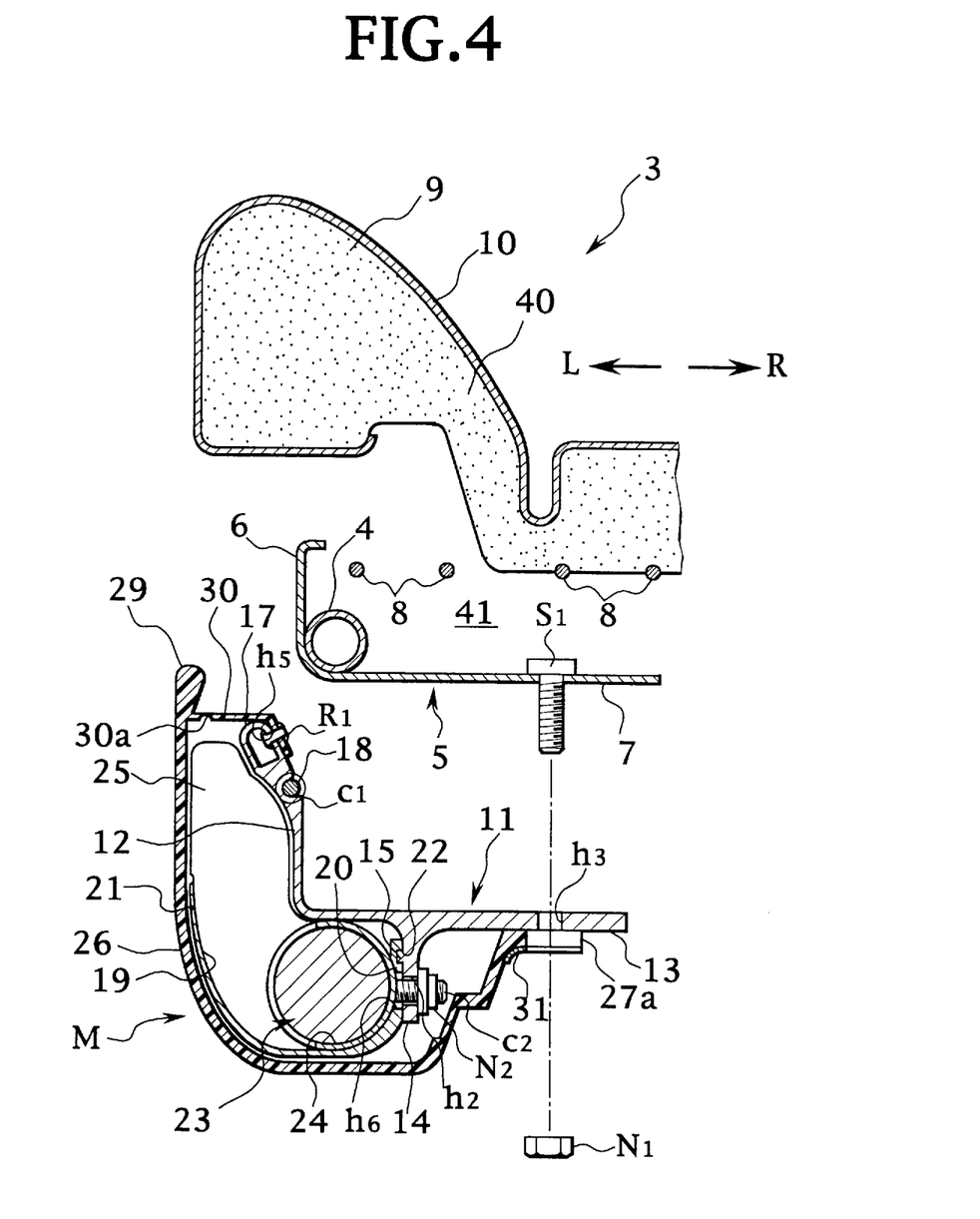
FIG. 4 is a cross sectional view showing a portion including a weld bolt to illustrate a method of attaching an air bag module.
Figure 5:
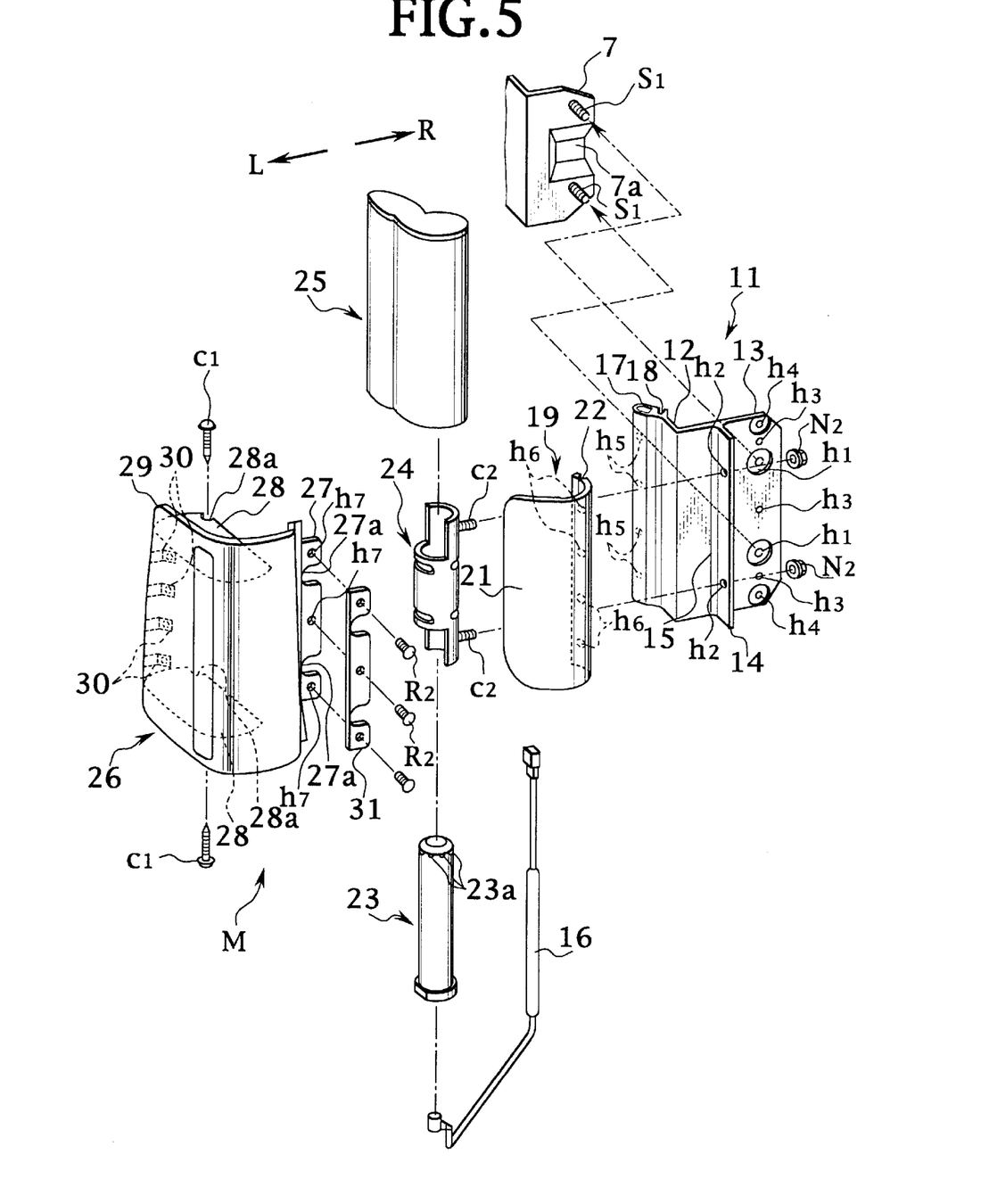
FIG. 5 is an exploded view showing the structure of the air bag module.

As shown in FIG. 2, a side bracket 5 is welded to the left-hand portion (in the outer portion of the widthwise direction of the vehicle) of the seat back frame 4. The side bracket 5 has a substantially L-shape cross section having a side panel 6 extending in the lengthwise direction and a rear panel 7 bent at the rear end of the side panel 6 to extend to the right (to the inner portion in the widthwise direction of the vehicle). The side panel 6 of the side bracket 5 has a length shortened in the lengthwise direction. Two weld bolts S1 are vertically disposed at the right-hand end surface of the rear panel 7, as shown in FIGS. 4 and 5. In the central portion of the rear panel 7, there is formed a recess 7a for preventing interference with a rivet R2 to be described later. Between the right and left brackets 5, there are disposed an S-shape seat spring 8 and a lumbar support mechanism (not shown).

Pads 40 for realizing cushioning characteristic are provided for the front surface and the side surface of the seat back 3. The pad 40 has a skin 10 provided except for the rear portion. A portion of the pad in the outer portion in the widthwise direction of the vehicle forms a side pad portion 9 projecting more forward than the central portion of the same. The side panel 6 of the side bracket 5 is disposed in the rear of the side pad portion 9.

A region 41 in which the pads 40 and the skin 10 do not exist is provided for a portion of the seat back 3 around the side bracket 5. The side bracket 5 is exposed over the region 41. An air bag module M is attached to the side bracket 5 exposed in the region 41.

The structure of the air bag module M will now be described with reference to FIG. 5.

The air bag module M has a base 11 serving as a first member, a guide 19 serving as a second member, an inflator 23, an air bag body 25 and a cover 26.

The base 11 is made of an extruded aluminum alloy and has a shape substantially adaptable to the side bracket 5. Since the base 11 is the extruded member, it can easily be used commonly as either the right-hand element or the left-hand element when it is turned upside down.

The base 11 is formed to have a substantially L-shape cross section having a side adaptation portion 12 and a rear adaptation portion 13 and disposed in such a manner that the seat back frame 4 is disposed in the inside portion of the corner of the L-shape portion. The rear adaptation portion 13 is attached to the rear panel 7. The side adaptation portion 12 is in close contact with the side panel 6 in a state where the rear adaptation portion 13 has been attached to the rear panel 7. A rearward projection 14 is formed at an intermediate position of the side adaptation portion 12. The projection 14 has, on the left-hand surface of the base portion thereof, a projecting portion 15 formed vertically. Two holes h2 are formed vertically adjacent to the projecting portion 15. Two fixing holes h1 corresponding to weld bolts S1 for the side bracket 5 and fixing holes h3 for securing a cover 26 to be described later are formed at the right-hand end of the base 11. Moreover, two clip holes h4 are formed at the right-hand end of the base 11 in addition to the above-mentioned fixing holes h1 and h3. The clip holes h4 are formed to receive inserted fixing clips (not shown) for a harness 16 to be described later.

On the other hand, a leading end 17 of the side adaptation portion 12 of the base 11 is formed into a shape having a hollow cross section and a rounded leading end. The leading end 17 is in a state where it projects more forward than the side panel 6 because the side panel 6 is shortened as described above. The leading end 17 has four holes h5 in the right-hand side surface.

The leading end 17 of the side adaptation portion 12 is inclined to the left (to the outer portion in the widthwise direction of the vehicle) with respect to the side panel 6 of the side bracket 5. A receiving groove 18 for receiving a screw C1 to be described later is vertically and continuously formed at the root of the leading end 17. Note that the above-mentioned fixing holes h1 to h5 are formed symmetrically in the vertical direction so as to be commonly used regardless of the right-hand portion or the left-hand portion.

The guide 19 is made of an aluminum alloy and provided individually from the base 11, the guide 19 being formed to forward restrict the unfolding direction of the air bag body 25. The guide 19 is warped to form a substantially U-shape to cover the outer region of an inflator 23 to be described later in the widthwise direction of the vehicle. Between a leading end 21 of the guide 19 and the base 11, there is formed an opening in a direction in which the air bag body 25 is unfolded. The thickness of the guide 19 is gradually reduced from the base portion thereof to the leading end thereof and has strength with which the guide 19 can be deformed by the unfolding force of an air bag body 25 to be described later. The leading end of the guide 19 has the smallest thickness and formed into a straight shape extending forwards. An elongated hole h6 formed in the lengthwise direction to correspond to the hole h2 of the projection 14 is formed in the base portion of the guide 19. A locating groove 22 arranged to be engaged to the projecting portion 15 to locate the positions of the holes h2 and h6 is formed adjacent to the foregoing base portion. Also the guide 19 is molded by extruding similarly to the base 11.

The inflator 23 has a columnar shape and stood erect in the rear of the seat back frame 4. The inflator 23 has a gas jetting hole 23a at the top end thereof. A harness 16 is connected to the lower end of the inflator 23, the harness 16 being secured within the clip holes h4 of the base 11 by a clip (not shown) as described above. Note that the inflator 23 is an inflator of a type in which high pressure gas is previously charged.

The inflator 23 is secured to the base 11 in a state where it has been inserted into a housing 24. The housing 24 is formed into a cylindrical shape having upper and lower portions which are notched half, the housing 24 having two bolts C2 projecting over the side surface thereof. The bolts C2 are allowed to pass through the holes h6 of the guide 19, and then inserted into the holes h2 of the projection 14 of the base 11 so as to be secured by lock nuts N2. Since each of the holes h6 has the elongated shape, the inflator 23 can easily be inserted deeply into the guide 19.

The air bag body 25 is folded up and accommodated so as to easily be unfolded. The air bag body 25 includes the inflator 23 and the housing 24.

The inflator 23 and the housing 24 accommodated in the air bag body 25 are set to the base portion 20 of the guide 19, and then the bolts C2 of the housing 24 are allowed to pass through the holes h6 of the guide 19. Then, the bolts C2 are inserted into the holes h2 of the projection 14 of the base 11, and then secured by the lock nuts N2. As a result, the air bag body 25, the inflator 23 and the housing 24 are accommodated and attached into the space between the guide 19 and the base 11. Simultaneously, the base portion 20 of the guide 19 is held between the inflator 23 (specifically, between the housing 24 of the inflator 23) and the projection 14. The air bag body 25 extends forwards from the inflator 23 to the side adaptation portion 12 of the base 11.

The cover 26 is made of resin and formed into a curved shape for covering a region from the rear surface of the seat back 3 to the side surfaces of the same. The cover 26 has a base 27 in which three fixing holes h7 are formed to correspond to the fixing holes h3. Moreover, the base 27 has cut portions 27a for exposing the fixing holes h1. Moreover, a flat shape rib 28 is formed in each of the upper and lower portions of the inner surface of cover 26. A cut portion 28a opened on one side thereof to correspond to the receiving groove 18 of the base 11 is formed in the edge portion of each of the ribs 28. It is preferable that the cut portion 28a be formed into a shape having a small opening portion and large inner portion. Moreover, four tags 30 are formed in the front end 29 of the cover 26. A notched portion 30a having a small thickness is formed in the inner portion of the root of the tag 30. Since the tags 30 are formed in the front end 29 of the cover 26, they are located in a direction (that is, in the front portion) in which the air bag body 25 is unfolded.

Therefore, the guide 19, the inflator 23, the housing 24 and the air bag body 25 are attached to the base 11, and then the cut portions 28a formed in the ribs 28 provided for the cover 26 are secured to the receiving groove 18 of the base 11 with screws C1. Moreover, the tags 30 are, with rivets R1, secured to h5 formed in the leading end 17 of the base 11 so that the base 27 is superimposed on the rear adaptation portion 13 and the fixing holes h3 and h7 are aligned to each other. Then, the base 27 and the rear adaptation portion 13 are fixed with rivets R2 through a bracket 31 having the same shape as that of the base 27 of the cover 26. Thus, the air bag module M can be manufactured to serve as a part. In this state, the cover 26 is disposed adjacent to the outer surface of the guide 19.

The air bag module M is, from a rear position, attached to the side bracket 5 exposed in the region 41 of the seat back 3 from which the pads 40 and so forth are omitted. That is, the rear adaptation portion 13 and the side adaptation portion 12 of the base 11 of the air bag module M are brought into close contact with the rear panel 7 and the side panel 6 of the side bracket 5. Moreover, the seat back 4 is placed in the inner portion of the corner of the base 11, and then the fixing holes h1 of the air bag module M are aligned to the weld bolts S1 of the side bracket 5 so as to be fixed with nuts N1. After the air bag module M has been attached, a trim 32 is finally attached to the rear surface of the seat back 3 with a clipping means (not shown).

In a state where the air bag module M has been attached as described above, the inflator 23 in the air bag module M is placed in the rear of the seat back frame 4 of the side bracket 5 facing the rear panel 7 and only the soft air bag body 25 exists in the portion adjacent to the side panel 6. Therefore, the side portion of the seat back 3 does not project to the wall of the body. That is, even if the air bag body 25 is placed adjacent to the side panel 6, side projection of the air bag module M can satisfactorily be prevented when the air bag body 25 is folded up and accommodated because the air bag body 25 is a soft bag. Since also rearward projection of the air bag module M is limited to only the rear portion of the side portion of the seat back 3, a satisfactory large clearance for a passenger on the rear seat can be maintained.

Figure 3:
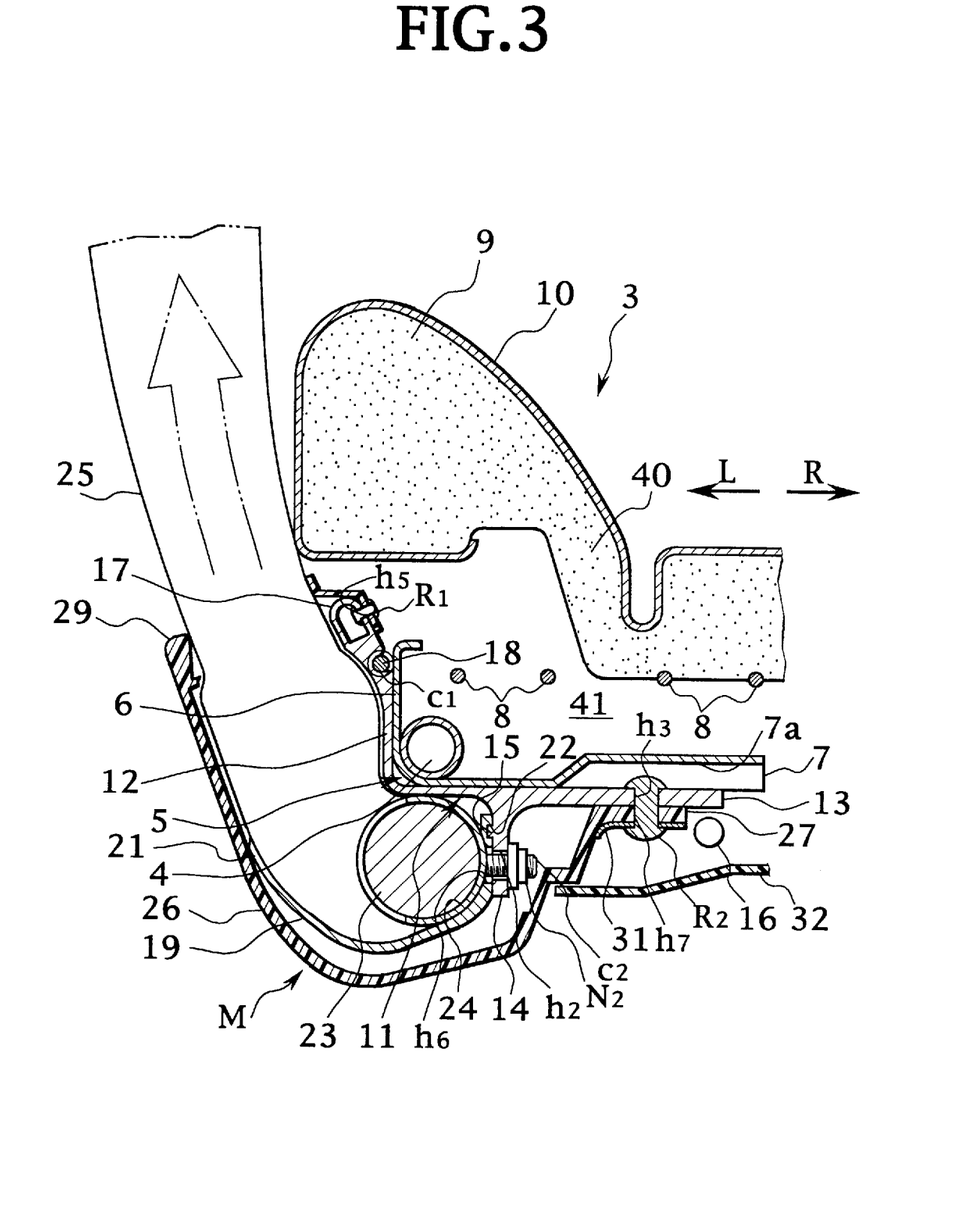
FIG. 3 is a cross sectional view showing a state where the air bag body has been unfolded and corresponding to FIG. 2.

A state for unfolding the air bag body 25 will now be described with reference to FIG. 3.

If a collision of the vehicle takes place, a signal denoting this is supplied to the inflator 23 through the harness 16 so that a large quantity of gas is jetted out from the inflator 23. Since the air bag body 25 is expanded in the cover 26 attributable to the jetted gas, the expanding force of the gas splits the notched portions 30a of the tags 30 in the front end 29 of the cover 26. Since the ribs 28 of the cover 26 are secured by the cut portions 28a and the screws C1, the ribs 28 can easily be separated and thus the front end of the cover 26 is opened. When the cover 26 has been opened, the opened cover 26 and the guide 19 restrict the unfolding direction of the air bag body 25 to only the forward direction. Thus, the air bag body 25 is unfolded and expanded at the side position of the seat back 3. Since the guide 19 is deformed to the left attributable to the unfolding force of the air bag body 25, a space between the guide 19 and the base 11 is enlarged. As a result, a space required for the air bag body 25 to be unfolded can be maintained. As a result, the air bag body 25 can reliably be unfolded in the forward direction so that the passenger is protected. Reaction force (reaction force from the inflator 23 to the base 11) generated when unfolding is performed is effectively transmitted to the seat back frame 4 by the base 11 having the substantially L-shape cross section.

Advantages of this embodiment will now be described.

Easy Mounting of Inflator 23 and Air Bag Body 25:

Since the base 11 and the guide 19 are individual parts, an operation for mounting the inflator 23 and the air bag body 25 on a space sectioned by the base 11 and the guide 19 can easily be performed. That is, only by attaching the guide 19 to the base 11 in a state where the inflator 23, the air bag body 25 and the like are held between the base 11 and the guide 19, the inflator 23 and the air bag body 25 can be mounted on a space between the guide 19 and the base 11.

Improvement in Strength of Guide 19 Attached to Base 11:

Since the base portion 20 of the guide 19 is held between the projection 14 and the inflator 23 (the housing 24), the guide 19 can strongly be attached to the base 11 although the guide 19 is the individually provided. Since the base portion 20 of the guide 19 is thicker than the leading end 21, also this structure contributes to improving the strength of the guide 19 attached to the base 11. Since the base portion 20 of the attached guide 19 is attached strongly, the pressure generated when the air bag is unfolded acts on the deformed portion of the guide 19.

Improvement in Working Property When Guide 19 is Mounted:

Since the base portion 20 of the guide 19 is located with respect to the projection 14 as a result of the engagement between the projecting portion 15 and the locating groove 22 and thus the their holes h2 and h6 are aligned to one another, the operation for inserting the bolts C2 of the housing 24 can easily be performed. Thus, the guide 19 can easily be mounted.

Effect of Preventing Side Projection of Seat Back 3:

Since the inflator 23 of the air bag module M is disposed adjacent to the rear panel 7 of the side bracket 5, side projection of the side portion of the seat back 3 can be prevented. Therefore, the gap between the side portion of the seat back 3 and the side wall (a door or the like) of the car body can be enlarged. As a result, an operation for mounting the left-hand front seat 1 on the car body can easily be performed.

Reliable Unfolding of Air Bag Body 25:

Since the inflator 23 is disposed on the rear side, the air bag body 25 is initially unfolded to the left. However, the warped guide 19 having the leading end 21 facing forwards restrict (turn) the unfolding direction to the forward direction. Usually, the air bag body 25 is compactly folded up and accommodated to reduce the amount of the side projection of the seat back 3. Also the space realized by the guide 19 and the base 11 is correspondently reduced. Since the small space is unsatisfactory to reliably unfold the air bag body 25 when the air bag apparatus is operated, the strength of the guide 19 causes the guide 19 to be deformed outwards to enlarge the space when the air bag body 25 is unfolded. Thus, the air bag body 25 can reliably be unfolded.

Since the thickness of the guide 19 is gradually reduced from the base portion 20 to the leading end 21, the base portion 20 cannot easily be deformed and the leading end 21 can easily be deformed. Thus, a satisfactory effect of restricting (pushing) the direction in which the air bag body 25 is unfolded to the forward direction can be obtained.

If side pressure is applied to the cover 26, the pressure is received by the guide 19. Thus, dents of the cover 26 can be prevented.

Although the above-mentioned embodiment has the structure such that the present invention is applied to the seat for a vehicle, the present invention is not limited to this. The present invention may be applied to various air bag apparatuses, for example, an air bag apparatus for a passenger seat, the unfolding direction of the air bag body of which must be restricted.

What is claimed is:

1. An air bag apparatus for a vehicle comprising:
   a bracket located rearwardly of a seat back portion of a seat and separate from a seat cushion supported on the seat back portion; and
   an air bag module attached to said bracket so as to be located rearwardly of the seat back portion and separate from the seat cushion, wherein
      said air bag module comprises a first member, a second member, an inflator for generating gas, and an air bag body which is unfolded by gas generated by said inflator,
   said second member restricts a direction in which said air bag body is unfolded,
   said first and second members are individual members which assemble to create a space, and
   said inflator and said air bag module are disposed in the space created by said first and second members.

2. An air bag apparatus for a vehicle comprising:
   a bracket secured to an arbitrary position of a vehicle; and
   an air bag module which comprises:
      a first member, a second member, an inflator for generating gas, and an air bag body which is unfolded by gas generated by said inflator, wherein said first member and said second member are individual members arranged to be assembled to create a space, said inflator and said air bag module are disposed in the space created by said first and second members, said first member is a base which is attached to said bracket, said second member is a guide for restricting a direction in which said air bag body is unfolded, and a base portion of said guide is attached to a projection of said base.

3. An air bag apparatus for a vehicle according to claim 2, wherein:
   said inflator is attached to the projection of said base, and
   the base portion of said guide is held between said inflator and said base and supported thereby.

4. An air bag apparatus for a vehicle according to claim 2, wherein:
   either said base portion of said guide or the projection of said base has a vertically extending projection portion, and the other one of said base portion of said guide or the projection of said base, has a locating groove which engages the projection portion.

5. An air bag apparatus for a vehicle according to claim 2, wherein:
   said guide covers an outer region of said inflator,
   a leading end of said guide and said base form an opening in the direction in which said air bag body is unfolded.

6. An air bag apparatus for a vehicle according to claim 2, wherein:
   said guide has a structural strength which allows said guide to be deformed outwardly with respect to said air bag module when an unfolding force of said air bag body acts on said guide.

7. An air bag apparatus for a vehicle according to claim 6, wherein:
   said guide has a thickness which gradually reduces from the base portion thereof to a leading end thereof.

8. An air bag apparatus for a vehicle according to claim 1, wherein:
   said first member is a base which is attached to said bracket, and
   a base portion of said guide is attached to a projection of said base.

9. An air bag apparatus for a vehicle according to claim 8, wherein:
   said inflator is attached to the projection of said base, and the base portion of said guide is held between said inflator and said base so as to be supported thereby.

10. An air bag apparatus for a vehicle according to claim 8, wherein:

either said base portion of said guide or the projection of said base has a vertically extending projection portion, and the other one of said base portion of said guide or the projection of said base has a locating groove which engages said projection portion.

11. An air bag apparatus for a vehicle according to claim 8, wherein:

said guide covers an outer region of said inflator, and a leading end of said guide and said base form an opening in the direction in which said air bag body is unfolded.

12. An air bag apparatus for a vehicle according to claim 8, wherein:

said guide has strength with which said guide can be deformed to an outside of said air bag module when an unfolding force of said air bag body acts on said guide.

13. An air bag apparatus for a vehicle according to claim 12, wherein:

said guide has a thickness which is gradually reduced from the base portion thereof to a leading end thereof.

14. An air bag apparatus for a vehicle according to claim 5, wherein:

said air bag module is further provided with a resin cover which is split and opened when said air bag body is unfolded, and said cover is disposed adjacent to the outer surface of said guide.

15. An air bag apparatus for a vehicle according to claim 11, wherein:

said air bag module is further provided with a resin cover which is split and opened when said air bag body is unfolded, and said cover is disposed adjacent to the outer surface of said guide.

16. An air bag apparatus for a vehicle according to claim 1, wherein:

said first member is attached to said bracket, said inflator is attached to said base, and said second member is held between said inflator and said first member so as to be supported thereby.

17. An air bag apparatus for a vehicle according to claim 1, wherein:

one of said first and second members has a vertically extending projection portion, and the other of said first and second members has a locating groove arranged to engage the projection portion.

18. An air bag apparatus for a vehicle according to claim 1, wherein:

said second member covers an outer region of said inflator, and said first member and a leading end of said second member form an opening in the direction in which said air bag body is unfolded.

19. An air bag apparatus for a vehicle according to claim 1, wherein:

said second member has strength which permits said second member to be deformed outwardly with respect to said air bag module when an unfolding force of said air bag body acts on said second member.

20. An air bag apparatus for a vehicle according to claim 19, wherein:

said second member includes a base portion attached to the first portion, and said second member has a thickness which gradually reduces from the base portion to a leading end thereof.

* * * * *